United States Patent Office 3,501,205
Patented Mar. 17, 1970

3,501,205
LUBRICATION SYSTEM FOR HEAVY-DUTY BEARINGS
Josef Trubáček and Jan Sedlak, Blansko, Czechoslovakia, assignors to CKD Blansko, norodni podnik, Blansko, Czechoslovakia
Filed Mar. 15, 1968, Ser. No. 713,360
Claims priority, application Czechoslovakia, Mar 16, 1967, 1,904/67
Int. Cl. F16c 17/06, 17/08
U.S. Cl. 308—160                  5 Claims

ABSTRACT OF THE DISCLOSURE

The annular lower bearing face of a horizontal turntable is divided into land portions by radial grooves which connect upwardly open annular channels having overflow edges above the level of the bearing face. Each land portion has a central recess supplied with lubricant under high pressure from two pumps connected with circumferentially alternating recesses, and also feeding lubricant under lower pressure directly to the grooves.

BACKGROUND OF THE INVENTION

This invention relates to heavy-duty bearings and particularly to a lubrication system for such bearings.

When two bodies are connected for relative movement by respective slidably engaged bearing faces, it is known to provide at least one of the bearing faces with recesses, and to supply the recesses with a fluid lubricant by means of a pressure pump so that the lubricant in the recesses carries a portion of the bearing pressure. In the event of a pump failure, the lubricant pressure may drop rapidly while the two bodies continue moving relative to each other by inertia, and the bearing pressure on the land portions of the bearing face between the recesses may be increased until seizing and damage to the machinery result. It is therefore conventional to supply such hydraulic or pneumatic bearing arrangements with stand-by pumps whose independent power sources are automatically started when the pressure in the fluid circuit drops. Emergency equipment which stands idle under normal operating conditions is notoriously unreliable.

An object of the invention is an improvement in the lubrication system for a bearing of the type described which makes the system more reliable.

SUMMARY OF THE INVENTION

With this object and others in view, as will hereinafter become apparent, the invention provides one of two slidably engaged bearing faces with a plurality of recesses and a plurality of elongated grooves, the remainder of the face constituting a plurality of continuous land portions. The rim of each recess extends in a closed loop in a corresponding land portion, and the grooves separate respective land portions from each other, Lubricant fluid is normally fed under pressure to the recesses and to the grooves, and is released from the grooves.

An overflow arrangement may communicate with the grooves in such a manner as to maintain therein a static fluid pressure smaller than the pressure of the fluid normally supplied to the same, which pressure in turn is normally lower than the pressure of the fluid supplied to the recesses.

Other features, additional objects, and many of the attendant advantages of this invention will readily be appreciated as the same becomes better understood by reference to the following detailed description of a preferred embodiment when considered in connection with the appended drawing.

DESCRIPTON OF THE PREFERRED EMBODIMENT

Figure 1:
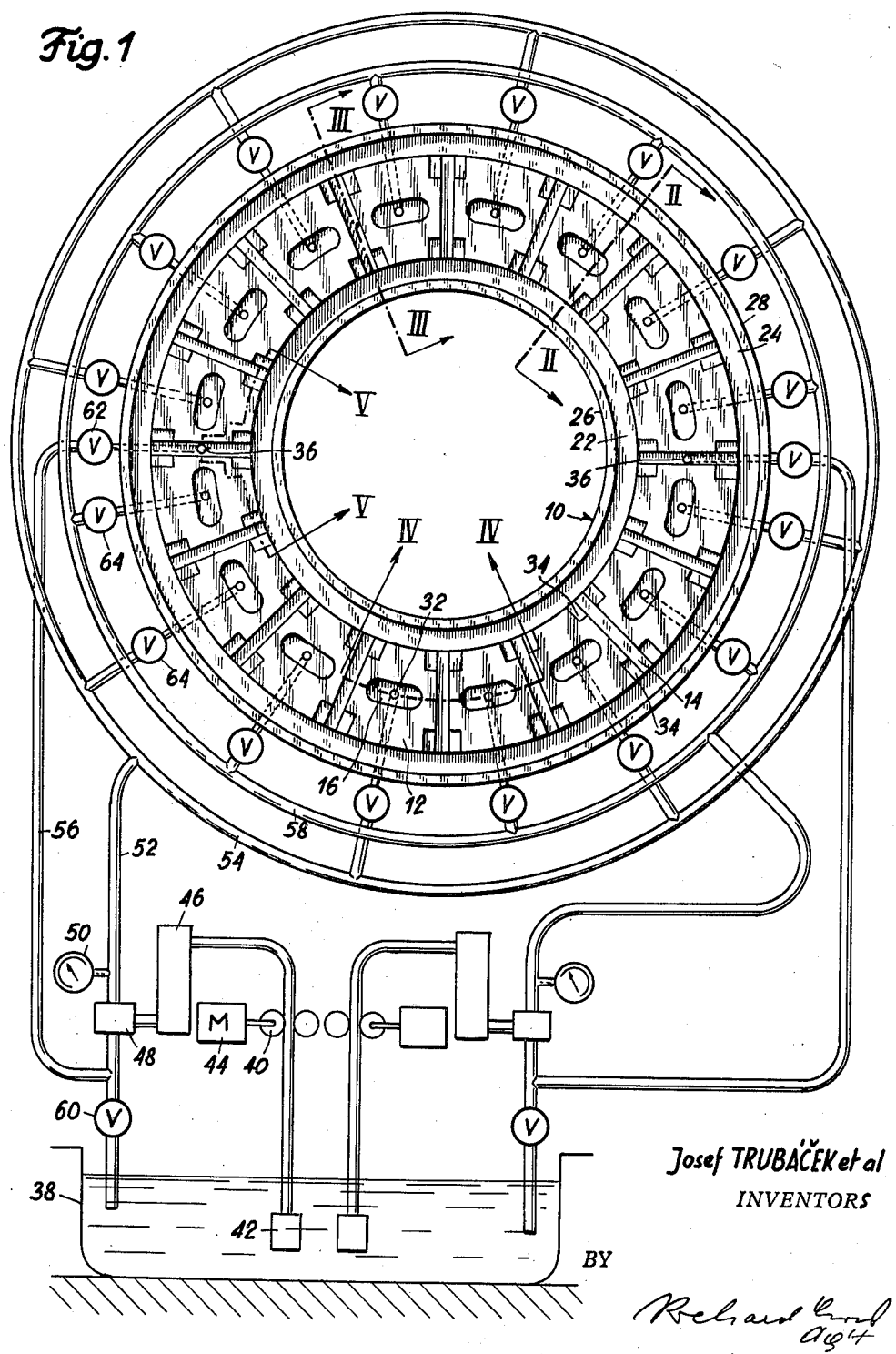
FIG. 1 shows the lower bearing ring of a turntable bearing of the invention in top plan view, and an associated hydraulic system in a conventional manner, mainly in side elevation.

Referring now to the drawing in detail, and initially to FIG. 1, there is seen the lower bearing ring 10 of a turntable for a vertical lathe, not otherwise shown. The annular bearing face of the ring 10 is divided into sixteen land portions 12 by as many narrow, radial grooves 14. A circumferentially elongated recess 16 is approximately centered in each continuous land portion 12, and its rim thus extends in a continuous loop in the associated land portion.

Figure 2:
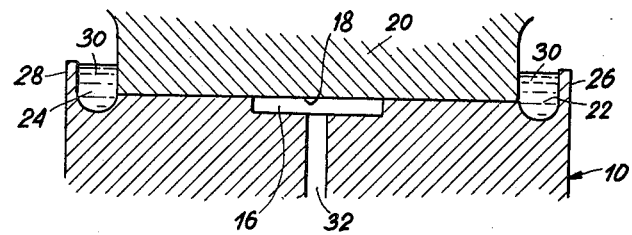
FIGS. 2 to 5 show the bearing ring of FIG. 1 together with the associated upper bearing ring in respective enlarged, fragmentary, elevational sections on the lines II—II, III—III, IV—IV, and V—V in FIG. 1.

As is best seen in FIG. 2, each recess 16 is seemingly sealed by an opposite bearing face 18 of the upper bearing ring 20. The lower bearing ring 10 projects radially inward and outward beyond the upper ring 20, and the projecting annular portions of the lower ring 10 are formed with channels 22, 24 which are upwardly open to the atmosphere and are radially bounded by annular walls 26, 28 which project above the flat horizontal plane of engagement between the bearing rings 10, 20. The channels 22, 24 are normally filled with liquid lubricant 30 to overflow over the top edges of the walls 26, 28. Lubricant is supplied to the recesses 16 through bores 32 in the lower ring 10 as will presently be described.

Figure 3:
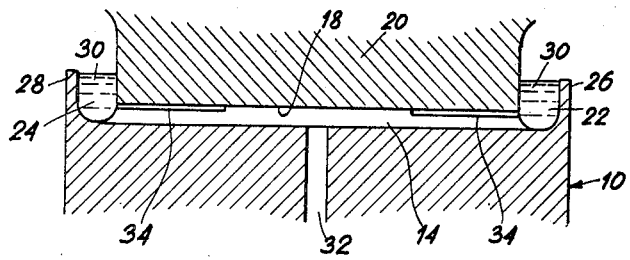
Figure 4:
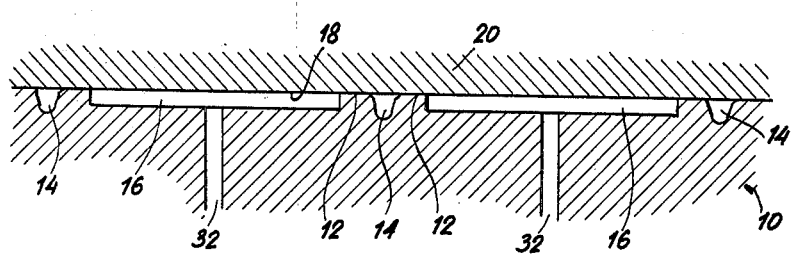
Figure 5:
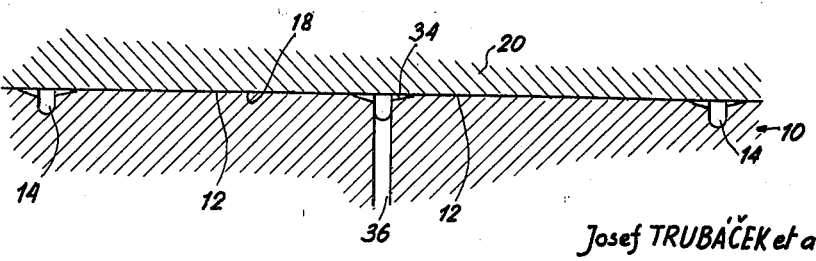

As is best seen in FIG. 3, the channels 22, 24 are connected by the grooves 14 in such a manner that the lubricant 30 is held in the grooves under a hydrostatic pressure determined by the height of the overflow walls 26, 28, the grooves 14 being upwardly sealed by the upper bearing face 18 so far as can be seen on the scale of the drawing. The two longitudinal end portions 34 of each groove 14 flare transversely toward the associated land portions 12 as is evident also from FIG. 5. The centers of two diametrically opposite grooves 14 communicate with bores 36 in the ring 10.

Reverting now to FIG. 1, the grooves 14 and recesses 16 are supplied with lubricant by two substantially identical hydraulic systems of which only one will be described in detail. Lubricant is drawn from a sump 38 common to both systems by a gear pump 40 through a strainer 42, the pump being driven by an electric motor 44. The lubricant is pumped under pressure through a cooler 46 to a reducing valve system 48 which transmits it under a high pressure indicated by a gage 50 and through a feed pipe 52 to a manifold 54. A low pressure line 56 connects the valve system 48 to one of the bores 36 and the associated groove 14, the other bore 36 being similarly supplied by the second hydraulic system which provides high pressure lubricant to a second manifold 58.

A return valve 60 connects the low pressure line 56 to the sump 38, and a throttling valve 62 in the line 56 provides further control of the flow rate and pressure in the connected groove 14. The manifolds 54, 58 are connected with circumferentially alternating bores 32 and recesses 16 through individual control valves 64.

When the pumps 40 operate, lubricant at high pressure is forced into the recesses 16 and carries a major portion of the bearing pressure when the turntable rotates. A lubricant film, too thin to be shown on the scale of FIGS. 2 to 5 flows from each recess 16 along the associated land portion 12 into the adjacent grooves 14, and is discharged mainly into the outer circumferential channel 24 by centrifugal forces. The lubricant supplied at low pressure to two grooves 14 mainly flows into the inner circumferential channel 22 and from there through the other grooves 14 into the outer channel 24. The lubricant overflowing the walls 26, 28 is returned to the sump 38 in a manner not explicitly shown. The oil circulating through the grooves 14 carries away much of the heat generated in the turntable bearing.

If one of the pumps 40 should break down, adequate lubrication is provided by the other pump to prevent damage to the machine until it can be stopped by automatic safety devices, not themselves shown. If both pumps should fail completely and simultaneously, as in a breakdown in the electrical power supply, emergency lubrication at the interface of the rings 10, 20 is supplied from the grooves 14 under the hydrostatic pressure maintained at the overflow walls 26, 28. The widely flaring end portions 34 of the grooves 13 replenish the lubricant film where it is most readily lost by radial flow along the interface.

If a leak in the high pressure pipe 52 should reduce the lubricant pressure in one of the two groups of recesses 16, adequate circulation would still be maintained through the grooves 14 to maintain a tolerable bearing temperature, and to prevent the damage which might occur when the lubricant viscosity is reduced by excessively high temperatures.

The grooves 14 not only improve the reliability of the lubrication system, but they also provide greater latitude in setting the individual control valves 64. If a bearing face is equipped only with recesses similar to the recesses 16, proper distribution of lubricant over the bearing face and proper distribution of bearing pressure among the several circumferential portions of the bearing face cannot be obtained unless the control valves precisely compensate for minor variations in the effective flow sections of the conduits connecting the recesses with the source of pressure fluid. The grooves 14, which communicate with the atmosphere, have an inherent equalizing effect. Reasonable differences in the fluid pressures of the several recesses 16 can therefore be tolerated.

While the illustrated bearing arrangement is a hydraulic thrust bearing having a vertical axis, many of the features of the invention described above with reference to the drawing are directly, and without modification applicable to pneumatic bearings, to sleeve bearings, and to bearings whose axis of rotation is horizontal, and those skilled in the art will readily modify other features discussed above to such non-illustrated types of bearings. Actually, the invention is not limited to bearings which connect two bodies for angular movement about a common axis, but may be used to advantage in connection with bearing faces of bodies which move relative to each other in a straight line or otherwise.

What is claimed is:
1. In a bearing arrangement connecting two bodies for relative movement, said bodies having respective slidably engaged bearing faces, and the arrangement including lubricating means for maintaining a film of fluid between said faces, the improvement in the lubricating means which comprises:
  (a) the bearing face of one of said bodies being formed with a plurality of recesses and a plurality of elongated grooves, the remainder of said face including a plurality of continuous land portions;
  (b) each of said recesses having a rim extending in a closed loop in a corresponding one of said land portions, and said grooves separating respective land portions from each other;
  (c) pressure fluid feeding means communicating with said recesses and said grooves for feeding fluid to the same under pressure;
    (1) pressure control means in said feeding means for holding the pressure of the fluid fed to said grooves at a lower value than the pressure of the fluid fed to said recesses; and
  (d) releasing means for releasing fluid from said grooves.

2. In an arrangement as set forth in claim 1, said releasing means including overflow means communicating with said grooves for maintaining a predetermined static pressure of said fluid in said grooves, said static pressure being smaller than the pressure of the fluid fed by said feeding means to said grooves.

3. In an arrangement as set forth in claim 3, said overflow means bieng open to the atmosphere.

4. In an arrangement as set forth in claim 1, said bearing face being annular about an axis, and said bodies being connected for relative angular movement about said axis, said recesses being circumferentially spaced about said axis and constituting two groups of recesses, each recess of one group being circumferentially interposed between two recesses of the other group, said feeding means including two independent sources of pressure fluid respectively communicating with said groups of recesses.

5. In an arrangement as set forth in claim 1, each of said grooves having a longitudinal portion flaring transversely toward the land portions separated thereby.

References Cited
UNITED STATES PATENTS
2,660,484  11/1953  Gerard et al. _____ 308—9
1,906,715  5/1933   Penick.

MARTIN P. SCHWADRON, Primary Examiner
FRANK SUSKO, Assistant Examiner